(12) United States Patent
Shin (10) Patent No.: US 12,351,777 B2
(45) Date of Patent: Jul. 8, 2025

(54) CERAMIC BALL HAVING DETERGENT FUNCTION AND MANUFACTURING METHOD THEREOF

(71) Applicant: DAEEUN GLOBAL SOLUTION CO., LTD., Incheon (KR)

(72) Inventor: Kyung Sub Shin, Incheon (KR)

(73) Assignee: DAEEUN GLOBAL SOLUTION CO., LTD., Incheon (KR)

( * ) Notice: Subject to any disclaimer, the term of this patent is extended or adjusted under 35 U.S.C. 154(b) by 821 days.

(21) Appl. No.: 17/524,213

(22) Filed: Nov. 11, 2021

(65) Prior Publication Data

US 2023/0146963 A1 May 11, 2023

(51) Int. Cl.
| | |
|---|---|
| C04B 35/626 | (2006.01) |
| A47L 15/44 | (2006.01) |
| B26F 1/24 | (2006.01) |
| B28B 1/14 | (2006.01) |
| B28B 1/48 | (2006.01) |
| C04B 35/63 | (2006.01) |
| C04B 35/64 | (2006.01) |
| C11D 17/04 | (2006.01) |
| D06F 39/02 | (2006.01) |

(52) U.S. Cl.
CPC ........ *C11D 17/046* (2013.01); *A47L 15/4436* (2013.01); *B26F 1/24* (2013.01); *B28B 1/48* (2013.01); *C04B 35/6261* (2013.01); *C04B 35/62655* (2013.01); *C04B 35/63* (2013.01); *C04B 35/64* (2013.01); *D06F 39/024* (2013.01); *B28B 1/14* (2013.01); *C04B 2235/612* (2013.01); *C04B 2235/945* (2013.01); *C11D 2111/14* (2024.01)

(58) Field of Classification Search
CPC ................................... B28B 1/48; B26F 1/24
See application file for complete search history.

(56) References Cited

U.S. PATENT DOCUMENTS

2004/0222573 A1* 11/2004 Dominguez .......... B30B 15/024
264/678
2010/0010513 A1   1/2010 Yun et al.

FOREIGN PATENT DOCUMENTS

| | | |
|---|---|---|
| KR | 10-0932949 B1 | 12/2009 |
| KR | 10-2011-0006390 A | 1/2011 |
| KR | 10-2015-0051777 A | 5/2015 |
| KR | 10-1715275 B1 | 3/2017 |

OTHER PUBLICATIONS

KR 101715275 B1 (Shin Kyung Sub) Mar. 17, 2017 (English language machine translation). [online] [retrieved Nov. 22, 2024]. Retrieved from: Espacenet. (Year: 2017).*

* cited by examiner

*Primary Examiner* — Erin Snelting
(74) *Attorney, Agent, or Firm* — IP Legal Services, LLC (57) ABSTRACT

The present invention relates to a ceramic ball having a detergent function and a method for manufacturing a ceramic ball, which can improve washing capacity since the ceramic ball is molded such that the surface area coming into contact with water gets wider, and can improve production efficiency and reduce the manufacturing cost since it is possible to manufacture ceramic balls continuously and automatically.

4 Claims, 7 Drawing Sheets

CERAMIC BALL HAVING DETERGENT FUNCTION AND MANUFACTURING METHOD THEREOF

BACKGROUND OF THE INVENTION

Field of the Invention

The present invention relates to a ceramic ball having a detergent function and a method for manufacturing a ceramic ball which is used in a washing machine or a dishwasher, and more particularly, to a ceramic ball having a detergent function and a method for manufacturing a ceramic ball, which can improve washing capacity since the ceramic ball is molded such that the surface area coming into contact with water gets wider, and can improve production efficiency and reduce the manufacturing cost since it is possible to manufacture ceramic balls continuously and automatically.

Background Art

Figure 8:
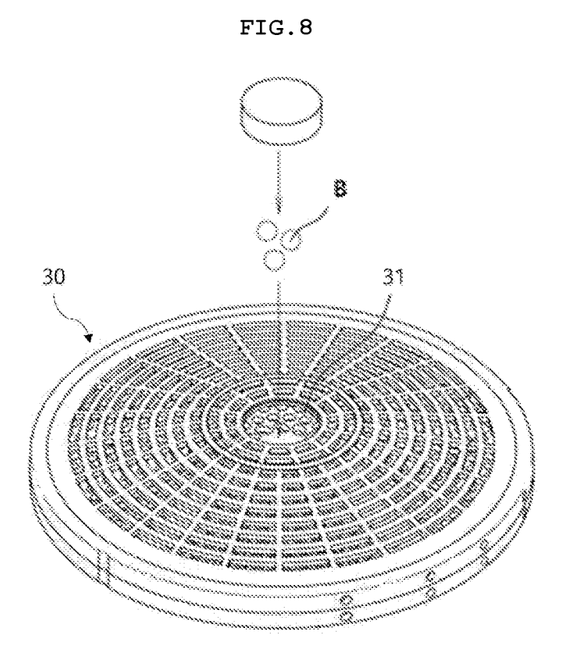
FIG. 8 is a view illustrating a configuration of a detergent dispensing device for a dish washer to which the ceramic ball of the present invention is applied.
Figure 9:
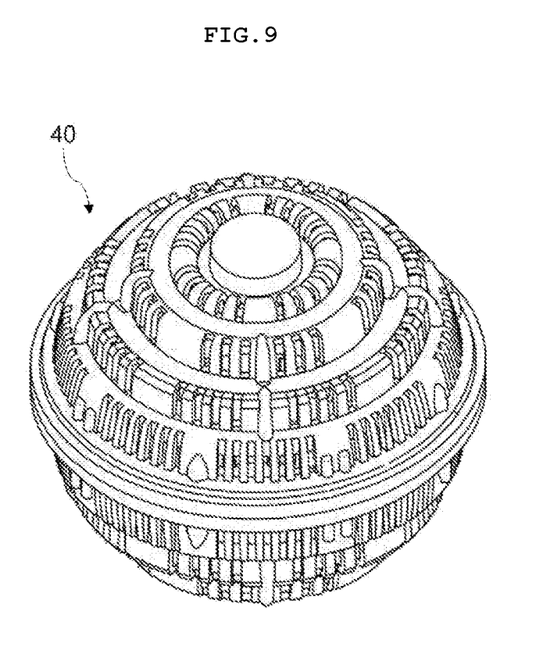
FIG. 9 is a view illustrating a configuration of a detergent dispensing device for a washing machine to which the ceramic ball of the present invention is applied.

In general, ceramic balls or washing balls having a detergent function are manufactured by ceramics being molded and burned in the form of a small ball, and are filled in an insertion part 31 of a detergent dispensing device 30 for a dish washer as illustrated in FIG. 8, or are filled in a detergent dispensing device 40 for a washing machine as illustrated in FIG. 9.

The detergent dispensing device 30 for the dish washer or the detergent dispensing device 40 for the washing machine in which the ceramic balls (B) are filled is inserted into the dish washer or the washing machine, so that dishes or laundry are cleaned or washed without using general detergent due to antibacterial effect and purification action caused by far-infrared radiation and anions emitted from the ceramic balls (B).

Korean Patent No. 10-1715275 granted to the inventor of the present invention discloses a ceramic ball (B) as a conventional art.

The conventional art relates to a ceramic ball having a detergent function and a method for manufacturing a ceramic ball which can improve washing capacity by widening the surface area of the ceramic ball getting in contact with water. That is, the conventional art provides an advantage to improve washing capacity by widening the surface area of the ceramic ball getting in contact with water.

Moreover, the conventional art has a groove formed in the ceramic ball in order to widen the surface area of the ceramic ball, and uses a groove making machine in order to form the groove in the ceramic ball.

However, because the groove making machine is a device to form a groove in the ceramic ball manually, it takes much time to form the groove in the ceramic ball. So, the groove making machine reduces production efficiency and increases the manufacturing cost.

Furthermore, because water flowing into the groove formed in the ceramic ball is not discharged out easily, there is a limitation in contact efficiency that the ceramic ball gets in contact with water.

PATENT LITERATURE

Patent Documents

Patent Document 1: Korean Patent No. 10-1715275
Patent Document 2: Korean Patent No. 10-0932949
Patent Document 3: Korean Patent Publication No. 10-2011-0006390

SUMMARY OF THE INVENTION

Accordingly, the present invention has been made to solve the above-mentioned problems occurring in the prior arts, and it is an object of the present invention to provide a ceramic ball having a detergent function and a method for manufacturing a ceramic ball, which can improve washing capacity since the ceramic ball is molded such that the surface area coming into contact with water gets wider, and can improve production efficiency and reduce the manufacturing cost since it is possible to manufacture ceramic balls continuously and automatically.

It is another object of the present invention to provide a ceramic ball having a detergent function and a method for manufacturing a ceramic ball, which can improve contact efficiency that the ceramic ball gets in contact with water since water can pass through a through hole formed in the ceramic ball.

To accomplish the above object, according to the present invention, there is provided a method for manufacturing a ceramic ball having a detergent function including: a first step of pulverizing and mixing raw materials in a fixed size to form feedstock powder; a second step of putting the feedstock powder formed through the first step into a ball shaping device and spraying water and a bonding agent to shape a ball; a third step of first drying the ball in order to form a through hole in the shaped ball; a fourth step of forming the through hole in the first dried ball by a through hole forming device; a fifth step of second drying the ball in order to perfectly remove moisture when forming the through hole in the ball is completed; and a sixth step of burning the dried ball to manufacture a ceramic ball.

The through hole forming device includes a ball aligning part and a through hole forming part which are formed in a row with a fixed slope. The ball aligning part is located at the uppermost part and automatically transferring the balls dried in the third step to the through hole forming part using vibration, and the through hole forming part temporarily fixes the ball transferred by the ball aligning part and forming a predetermined through hole in the ball.

Furthermore, the ball aligning part includes: a receiving part for receiving the plurality of balls; a vibration generating part mounted on the bottom surface of the receiving part to generate vibration so as to automatically transfer the balls received in the receiving part to a guide part formed at one side; and the guide part for aligning the balls received in the receiving part in a row and transferring them to the through hole forming part.

Additionally, the through hole forming part includes: a fixing part which is formed in a L-shape on which the received balls are seated, and has a plurality of first holes and a plurality of second holes which are formed in the lateral surface and the bottom surface thereof at regular intervals; a moving part which is mounted adjacent to one side of the fixing part, fixes and supports or transfers the balls seated on the fixing part through a back-and-forth movement, and has third holes formed at positions opposing to the first holes of the fixing part; a first perforating part which is mounted at the other side of the fixing part, a plurality of first perforating pins which are formed at one side thereof and are inserted into the first holes of the fixing part and the third holes of the moving part, and forms a first through hole in the ball seated on the fixing part by the back-and-forth movement; and a second perforating part which is mounted above the fixing part, has a plurality of second perforating pins which are formed at one side thereof and are inserted into the second holes of the fixing part, and forms a second through hole in the ball seated on the fixing part by the back-and-forth movement.

Moreover, the stopper part includes: a first stopper mounted in a first space between the guide part of the ball aligning part and the through hole forming part; and a second stopper mounted in a second space between the through hole forming part and the discharge part.

Furthermore, in another aspect of the present invention, provided is a ceramic ball having a detergent function including: a first through hole and a second through hole formed in the shape of a cross; and a first area part and a second area part respectively formed by the first through hole and the second through hole so that a cross-sectional area between the ceramic ball and water is increased and water flows through the first through hole and the second through hole.

According to an embodiment of the present invention, the ceramic ball having a detergent function and the method for manufacturing the ceramic ball can improve washing capacity since the ceramic ball is molded such that the surface area coming into contact with water gets wider, and can improve production efficiency and reduce the manufacturing cost since it is possible to manufacture ceramic balls continuously and automatically.

According to an embodiment of the present invention, the ceramic ball having a detergent function and the method for manufacturing the ceramic ball can improve contact efficiency that the ceramic ball gets in contact with water since water can pass through a through hole formed in the ceramic ball.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, preferred embodiments of the present invention will be described in detail with reference to the accompanying drawings.

In the following description, the same components will be designated by the same reference numerals although they are shown in different drawings. Further, in the following description of the present invention, a detailed description of known functions and configurations incorporated herein will be omitted when it may make the subject matter of the present invention rather unclear.

Figure 1:
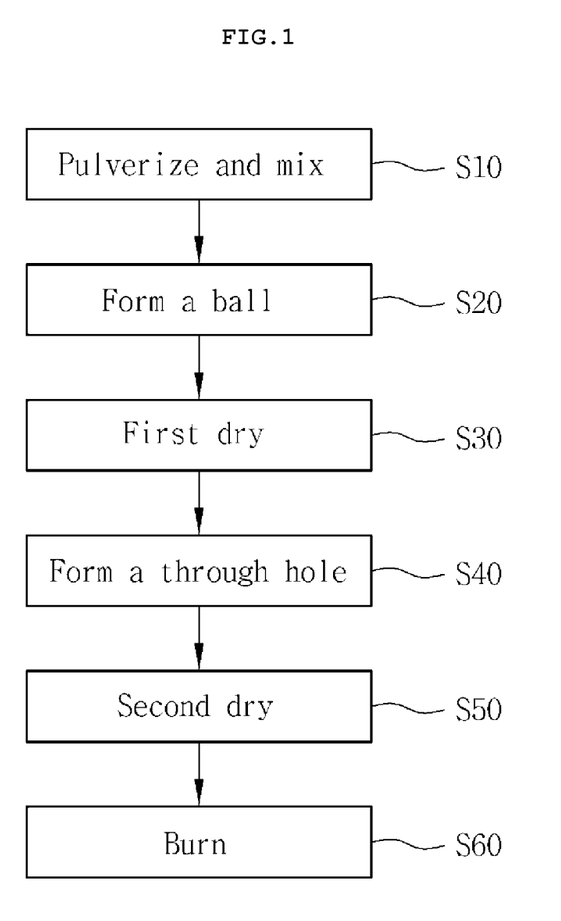
FIG. 1 is a flow chart illustrating a method for manufacturing a ceramic ball having a detergent function according to a preferred embodiment of the present invention.

FIG. 1 is a flow chart illustrating a method for manufacturing a ceramic ball having a detergent function according to a preferred embodiment of the present invention.

As illustrated in the drawing, the method for manufacturing a ceramic ball having a detergent function according to the embodiment of the present invention includes: a first step (S10) of pulverizing and mixing raw materials in a fixed size to form feedstock powder; a second step (S20) of putting the feedstock powder formed through the first step into a ball shaping device and spraying water and a bonding agent to shape a ball; a third step (S30) of first drying the ball in order to form a through hole in the shaped ball; a fourth step (S40) of forming the through hole in the first dried ball by a through hole forming device; a fifth step (S50) of second drying the ball in order to perfectly remove moisture when forming the through hole in the ball is completed; and a sixth step (S60) of burning the dried ball to manufacture a ceramic ball.

The first step (S10) is a step of pulverizing and mixing raw materials into a fixed size to form feedstock powder. The feedstock powder mainly includes silicon oxide ($SiO_2$), aluminum oxide ($Al_2O_3$), and zirconium oxide ($ZrO_2$).

The second step (S20) is a step of putting the feedstock powder formed through the first step into a ball shaping device and spraying water and a bonding agent to shape a ball. The ball is shaped by a ball shaping device 10 illustrated in FIG. 2.

Figure 2:
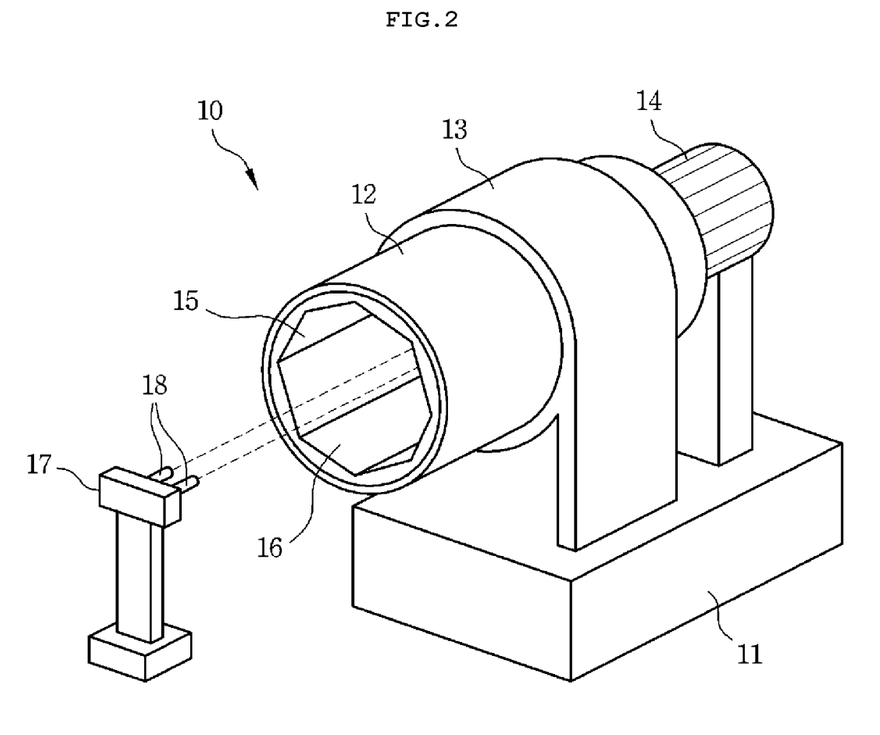
FIG. 2 is a view illustrating a configuration of a ball molding machine applied to the present invention.

The ball shaping device 10 is known-technology, for instance, disclosed in Korean Patent Publication No. 10-2015-0051777 invented by the inventor of the present invention. Now, the configuration of the ball shaping device 10 and the step of shaping the ball will be described.

The ball shaping device 10 includes: a rotary drum 12 rotatably mounted above a base 11 with a constant slope through a rotary support part 13; a driving part 14 for rotating the rotary drum 13; a polygonal part 16 formed on the inner face of an insertion hole 15 formed at one side of the rotary drum 13; and a spray part 17 for spraying water and a bonding agent to the insertion hole 15 of the rotary drum 13 by a nozzle 18 at a fixed rate.

Now, a process of shaping a ball will be described. The feedstock powder is inserted into the insertion hole 15 of the rotary drum 13, and then, the rotary drum 13 is rotated.

After that, water and the bonding agent is sprayed into the insertion hole 15 by the nozzle 18 of the spray part 17 at the fixed rate.

The water and the bonding agent sprayed into the insertion hole 15 are bonded with the feedstock powder in the form of waterdrops, and at the same time, and roll inside the rotary drum 13 of which the inner surface is coated with cement so as to be naturally shaped into a plurality of balls.

Moreover, strength of the balls increases since the balls are formed while being bumped against the polygonal part 16.

The third step (S30) is a step of first drying the ball in order to form a through hole in the shaped ball, namely, is a step of properly drying moisture in order to form a through hole in the ball without the burning step.

Preferably, it takes two to three hours to dry moisture. In this instance, the surface of the ball is soft and flexible since moisture is removed.

Figure 3:
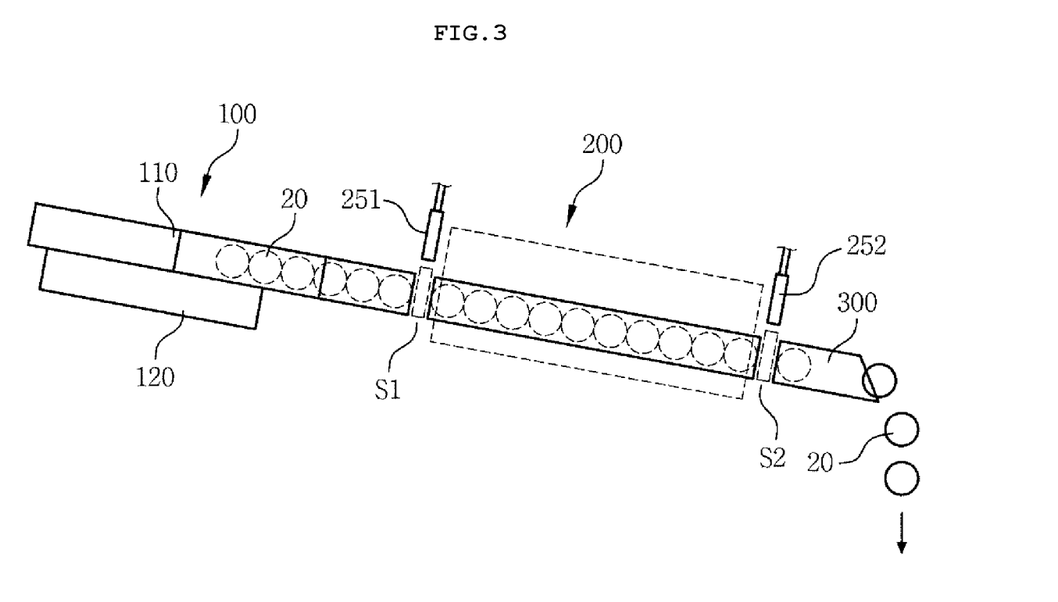
FIG. 3 is a schematic side view illustrating a through hole forming device applied to the present invention.
Figure 4:
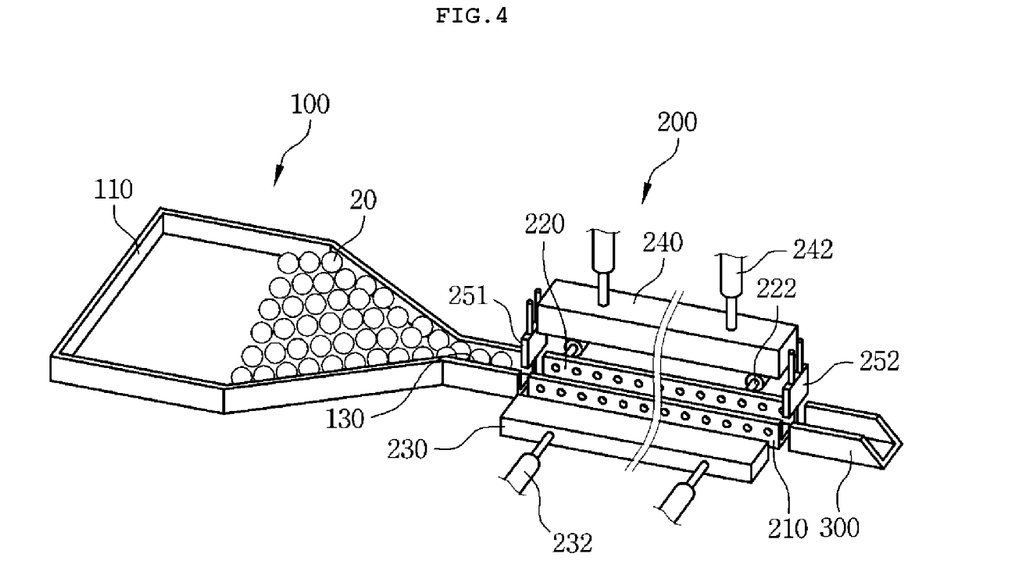
FIG. 4 is a perspective view illustrating the through hole forming device applied to the present invention.

The fourth step (S40) is a step of forming the through hole in the first dried ball by a through hole forming device. A through hole forming device illustrated in FIGS. 3 and 4 is provided in order to form a through hole in the ball.

The through hole forming device forms a through hole in the ball so as to increase the surface area of the ceramic ball 20 getting in contact with water.

The through hole forming device includes a ball aligning part 100, a through hole forming part 200, and a discharge part 300 which are connected in a row with a fixed slope.

The ball aligning part 100 is located at the uppermost part, and is a part to automatically transfer the balls dried in the third step (S30) to the through hole forming part 200. The ball aligning part 100 includes: a receiving part 110 for receiving the plurality of balls 20; a vibration generating part 120 mounted on the bottom surface of the receiving part 110 to generate vibration so as to automatically transfer the balls 20 received in the receiving part 110 to a guide part 130 formed at one side; and the guide part 130 for aligning the balls 20 received in the receiving part 110 in a row and transferring them to the through hole forming part 200.

Figure 5:
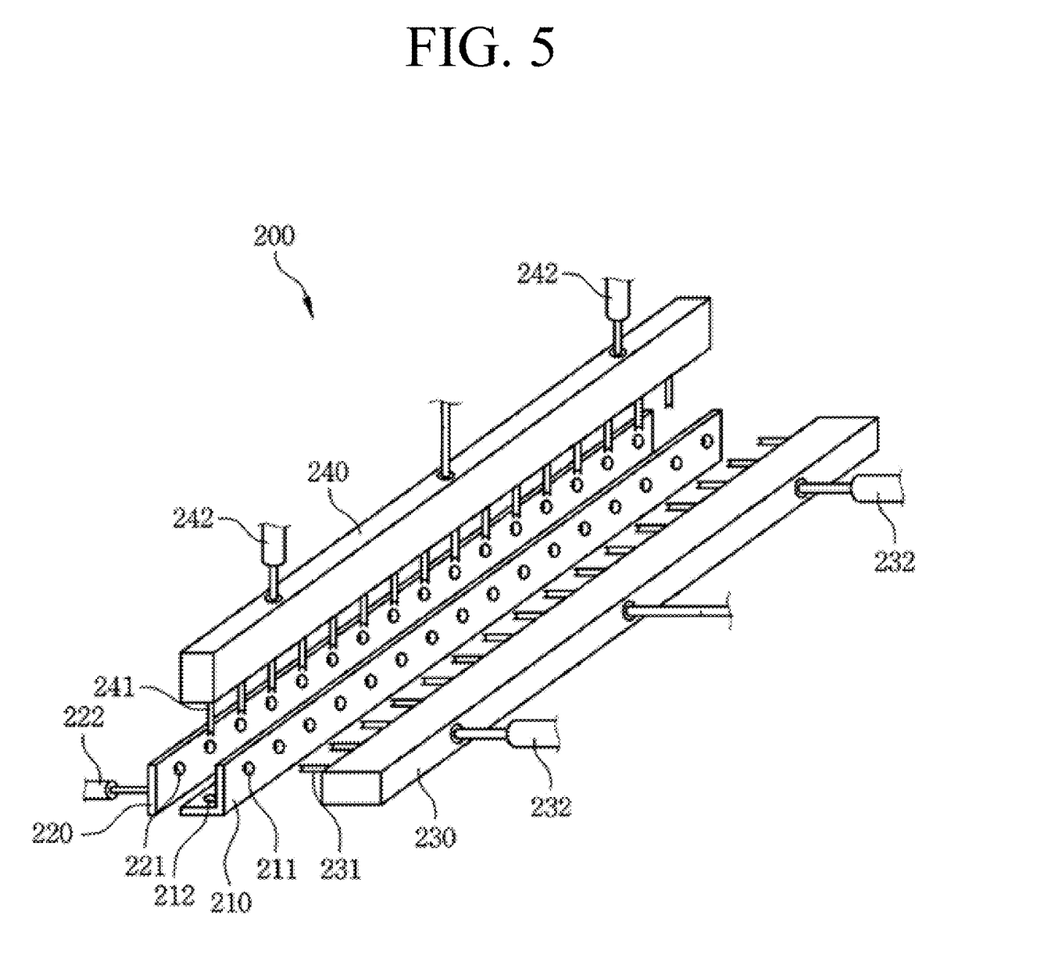
FIG. 5 is a view illustrating a configuration of the through hole forming device applied to the present invention.

As illustrated in FIG. 5, the through hole forming part 200 is to form a through hole after temporarily fixing the balls transferred through the ball aligning part 100, and includes a fixing part 210, a moving part 220, a first perforating part 230, a second perforating part 240, and a stopper part.

The fixing part 210 is formed in a L-shape, on which the received balls 20 are seated, and has a plurality of first holes 211 and a plurality of second holes 212 which are formed in the lateral surface and the bottom surface thereof at regular intervals.

The first holes 211 and the second holes 212 are holes into which perforating pins are inserted, and are designed to face the centers of the balls 20 seated on the fixing part 210.

The moving part 220 is mounted adjacent to one side of the fixing part 210, and fixes and supports or transfers the balls 20 seated on the fixing part 210 through a back-and-forth movement.

The moving part 220 has third holes 221 formed at positions opposing to the first holes 211 of the fixing part 210, and performs the back-and-forth movement through a first cylinder 222.

Figure 7A:
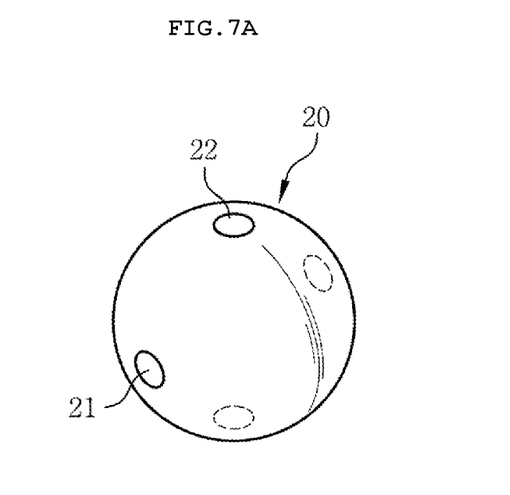
FIGS. 7A and 7B are respectively a perspective view and a sectional view of a ceramic ball having a detergent function according to the present invention.
Figure 7B:
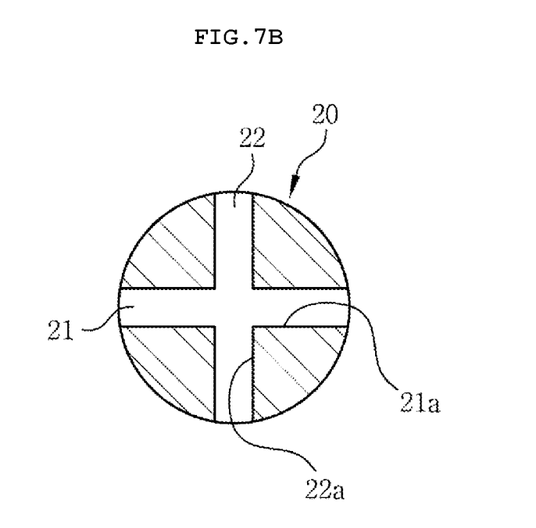

The first perforating part 230 is mounted at the other side of the fixing part 210, and forms a first through hole 21 in the ball 20 seated on the fixing part 210 by the back-and-forth movement as illustrated in FIGS. 7A and 7B.

The first perforating part 230 includes a plurality of first perforating pins 231 which are formed at one side thereof and are inserted into the first holes 211 of the fixing part 210 and the third holes 221 of the moving part 220, and moves in the back-and-forth direction through a second cylinder 232.

The second perforating part 240 is mounted above the fixing part 210 and perforates a second through hole 22 in the ball 20 seated on the fixing part 210 by the back-and-forth movement as illustrated in FIGS. 7A and 7B.

The second perforating part 240 includes a plurality of second perforating pins 241 which are formed at one side thereof and are inserted into the second holes 212 of the fixing part 210, and moves in the back-and-forth direction through a third cylinder 242.

The stopper part is mounted at both ends of the fixing part 210, and includes: a first stopper 251 mounted in a first space S1 between the guide part 130 of the ball aligning part 100 and the through hole forming part 200; and a second stopper 252 mounted in a second space S2 between the through hole forming part 200 and the discharge part 300.

Now, operations of the first stopper 251 and the second stopper 252 will be described. First, the first stopper 251 moves upwards to open the first space S1, and the second stopper 252 moves downwards to close the second space S2.

Therefore, the balls 20 transferred through the guide part 130 of the ball aligning part 100 are aligned on the fixing part 210 of the through hole forming part 200 in a row, but are blocked from being transferred to the discharge part 300 by the second stoper 252.

In the above state, the first stopper 251 moves downwards to close the first space S1 so that the balls 20 of a predetermined amount are seated on the fixing part 210.

When the balls 20 are seated on the fixing part 210, the through hole forming part 200 performs the step of forming the through hole in the ball 20. When the step of forming the through hole is finished, the second stopper 252 opens the second space S2 so that the balls 20 seated on the fixing part 210 are automatically transferred to the discharge part 300.

Next, the operation that the second stopper 252 closes the second space S2 and the first stopper 251 opens the first space S1 is repeated.

Figure 6A:
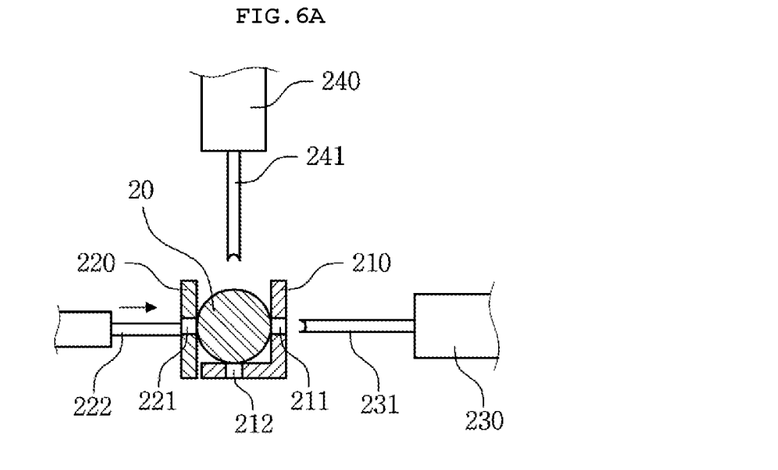
FIGS. 6A to 6C are sectional views illustrating the through hole forming device to show a through hole forming process according to the present invention.
Figure 6B:
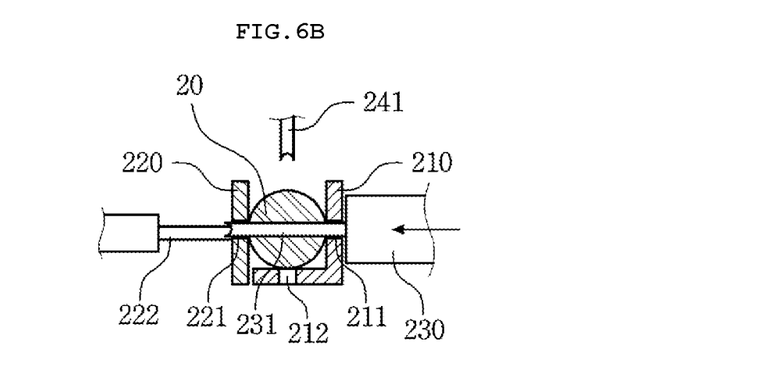
Figure 6C:
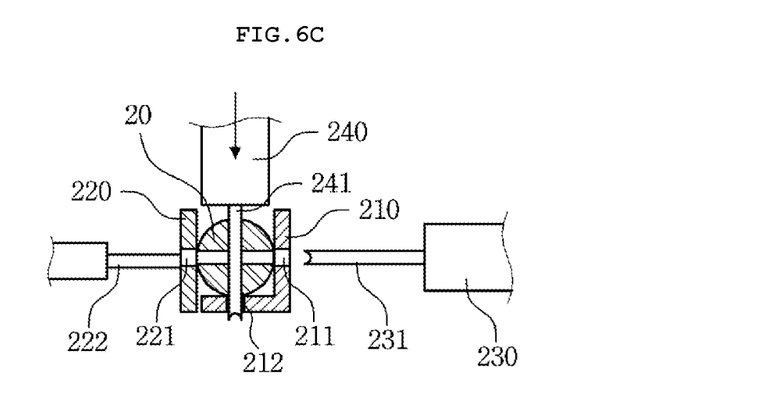

Meanwhile, referring to FIGS. 6A to 6C, the step of forming the through hole in the ball 20 by the through hole forming part 200 is described.

First, when the ball 20 is aligned and seated on the fixing part 210, as illustrated in FIG. 6A, the first cylinder 222 of the moving part 220 is operated to fix and support the ball 20 seated on the fixing part not to be moved.

Next, as illustrated in FIG. 6B, when the first perforating part 230 moves forwards by operation of the second cylinder 232, the first perforating pin 231 passes through the first hole 211 of the fixing part 210, the ball 20, and the third hole 221 of the moving part 220 in order, so that the first through hole 21 is formed in the ball 20 as illustrated in FIGS. 7A and 7B.

When the first through hole 21 is formed in the ball 20, the first perforating part 230 moves backwards to its original position. After that, as illustrated in FIG. 6C, when the second perforating part 240 moves forwards by operation of the third cylinder 242, the second perforating pin 241 passes through the ball 20 and the second hole 212 of the fixing part 210 in order, so that the second through hole 22 is formed in the ball 20 as illustrated in FIGS. 7A and 7B.

When the second through hole 22 is formed in the ball 20, the second perforating part 240 moves backwards to its original position.

The first through hole 21 and the second through hole 22 formed in the ball 20 are in the shape of a cross, a first area part 21a and a second area part 22a respectively formed by the first through hole 21 and the second through hole 22 increase a cross-sectional area that the ceramic ball 20 gets in contact with water, and water flows through the first through hole 21 and the second through hole 22, so that contact efficiency between the ceramic ball and water is increased so as to increase washing efficiency.

The fifth step (S50) is a step of second drying the ball in order to perfectly remove moisture when forming the through hole in the ball is completed, and is a preconditioning process for burning.

The sixth step (S60) is a step of burning the dried ball at a constant temperature for predetermined time to finally manufacture a ceramic ball.

Therefore, the manufactured ceramic balls 20 are filled in a detergent dispensing device 30 for a dish washer as illustrated in FIG. 8, or are filled in a detergent dispensing device 40 for a washing machine as illustrated in FIG. 9.

While the present invention has been described by the limited embodiments and the drawings as described above, the present invention is not limited by the above and various modifications and variations are possible to those skilled in the art from the above description.

What is claimed is:

1. A method for manufacturing a ceramic ball having a detergent function comprising:
    a first step of pulverizing and mixing raw materials in a fixed size to form feedstock powder;
    a second step of putting the feedstock powder formed through the first step into a ball shaping device and spraying water and a bonding agent to shape a plurality of balls;
    a third step of first drying the balls in order to form through holes in each of the shaped balls, wherein the through holes include a first through hole and a second through hole;
    a fourth step of forming the through holes in each of the first dried balls by a through hole forming device;
    a fifth step of second drying the balls in order to completely remove moisture when forming the through holes in each of the balls is completed; and
    a sixth step of burning the dried balls to manufacture a plurality of ceramic balls,
    wherein the through hole forming device includes a ball aligning part and a through hole forming part which are formed in a row with a fixed slope, the ball aligning part being located at an uppermost part and automatically transferring the balls dried in the third step to the through hole forming part using vibration, and the through hole forming part temporarily fixing each of the balls transferred by the ball aligning part and forming the through holes in each of the balls.

2. The method according to claim 1, wherein the ball aligning part includes: a receiving part for receiving the plurality of balls; a vibration generating part mounted on a bottom surface of the receiving part to generate vibration so as to automatically transfer the balls received in the receiving part to a guide part formed at one side; and the guide part for aligning the balls received in the receiving part in a row and transferring them to the through hole forming part.

3. The method according to claim 1, wherein the through hole forming part includes:
    a fixing part which is formed in a L-shape on which the received balls are seated, and has a plurality of first holes and a plurality of second holes which are formed in a lateral surface and a bottom surface of the fixing part at regular intervals;
    a moving part which is mounted adjacent to one side of the fixing part, fixes and supports or transfers the balls seated on the fixing part through a back-and-forth movement, and has third holes formed at positions opposing to the first holes of the fixing part;
    a first perforating part which is mounted at a side of the fixing part, which is opposite to the one side of the fixing part, a plurality of first perforating pins which are formed at one side of the first perforating part and are inserted into the first holes of the fixing part and the third holes of the moving part, and forms the first through hole in each of the balls seated on the fixing part by the back-and-forth movement; and
    a second perforating part which is mounted above the fixing part, has a plurality of second perforating pins which are formed at one side of the second perforating part and are inserted into the second holes of the fixing part, and forms the second through hole in each of the balls seated on the fixing part by the back-and-forth movement.

4. The method according to claim 3, wherein the through hole forming part includes a stopper part, and the stopper part includes: a first stopper mounted in a first space between the guide part of the ball aligning part and the through hole forming part; and a second stopper mounted in a second space between the through hole forming part and a discharge part.

* * * * *